United States Patent
Pearson et al.

(10) Patent No.: US 8,952,677 B2
(45) Date of Patent: Feb. 10, 2015

(54) LOCATOR FOR LOCATING A CURRENT CARRYING CONDUCTOR

(75) Inventors: Richard David Pearson, Bristol (GB); Jeffrey Richard Thompson, Cheltenham (GB); Derek James Wong, Bristol (GB)

(73) Assignee: Radiodetection Ltd., Bristol (GB)

(*) Notice: Subject to any disclaimer, the term of this patent is extended or adjusted under 35 U.S.C. 154(b) by 392 days.

(21) Appl. No.: 13/289,952

(22) Filed: Nov. 4, 2011

(65) Prior Publication Data

US 2013/0113456 A1 May 9, 2013

(51) Int. Cl.
*G01R 19/00* (2006.01)
*G01V 3/08* (2006.01)

(52) U.S. Cl.
CPC .................. *G01V 3/088* (2013.01)
USPC .......... 324/67; 324/326; 324/329; 324/234; 702/150; 702/189

(58) Field of Classification Search
CPC .......... G01V 3/165; G01V 3/26; G01V 3/28; G01V 3/34; G01V 3/81; G01V 3/88
USPC .......................................................... 324/67
See application file for complete search history.

(56) References Cited

U.S. PATENT DOCUMENTS

| | | | |
|---|---|---|---|
| 5,260,659 A * | 11/1993 | Flowerdew et al. | 324/326 |
| 6,777,923 B2 | 8/2004 | Pearson | |
| 7,062,414 B2 * | 6/2006 | Waite et al. | 702/189 |
| 7,612,557 B2 * | 11/2009 | Shimomura et al. | 324/207.26 |
| 7,639,094 B1 | 12/2009 | Stevenson | |
| 8,013,595 B2 * | 9/2011 | Jones et al. | 324/207.17 |
| 8,358,120 B2 * | 1/2013 | Huebler | 324/67 |
| 2003/0067293 A1 * | 4/2003 | Golder et al. | 324/67 |
| 2004/0169594 A1 * | 9/2004 | Ely et al. | 341/22 |
| 2006/0267590 A1 * | 11/2006 | Mizuno | 324/329 |
| 2006/0284616 A1 * | 12/2006 | Pearson et al. | 324/326 |
| 2007/0018632 A1 | 1/2007 | Royle | |
| 2007/0118312 A1 * | 5/2007 | Cech et al. | 702/65 |
| 2007/0200562 A1 * | 8/2007 | Shimomura et al. | 324/222 |

(Continued)

FOREIGN PATENT DOCUMENTS

| | | |
|---|---|---|
| GB | 2400674 A | 10/2004 |
| GB | 2400994 A | 10/2004 |

(Continued)

*Primary Examiner* — Benjamin M Baldridge
(74) *Attorney, Agent, or Firm* — Baker & Hostetler LLP

(57) ABSTRACT

A locator for locating a concealed conductor carrying an alternating current having at least first and second frequencies, the alternating current produced by at least one dedicated signal generator. The locator includes at least one magnetic field sensor operable to convert electromagnetic radiation from the conductor into a field strength signal; a digital analog converter configured to generate a digitized signal dependent upon the field strength signals from the magnetic field sensor; a digital signal processor configured to isolate components of the digitized signal resulting from the first frequency and the second frequency; and process the isolated components to generate one or more signals indicative of the proximity of the conductor to the detector; and an output configured to generate an audio and/or visual indication of the proximity of the conductor, wherein the isolated signal components resulting from the first frequency signal and the second frequency signal are contemporaneously processed.

20 Claims, 6 Drawing Sheets

(56) References Cited

U.S. PATENT DOCUMENTS

| | | | |
|---|---|---|---|
| 2007/0290672 A1* | 12/2007 | Worsley et al. | 324/67 |
| 2008/0246471 A1* | 10/2008 | Kahlman et al. | 324/234 |
| 2008/0252288 A1* | 10/2008 | De Boer et al. | 324/234 |
| 2008/0278156 A1* | 11/2008 | De Boer et al. | 324/234 |
| 2009/0030646 A1* | 1/2009 | Jones et al. | 702/150 |
| 2010/0001713 A1* | 1/2010 | Royle | 324/67 |
| 2010/0001731 A1* | 1/2010 | Royle et al. | 324/326 |
| 2010/0277163 A1* | 11/2010 | Nakamura et al. | 324/228 |
| 2011/0101985 A1* | 5/2011 | Mercer et al. | 324/326 |
| 2011/0181289 A1* | 7/2011 | Rushing | 324/326 |
| 2012/0286789 A1* | 11/2012 | Mercer et al. | 324/326 |
| 2013/0200901 A1* | 8/2013 | Olsson et al. | 324/326 |

FOREIGN PATENT DOCUMENTS

| | | |
|---|---|---|
| GB | 2412738 A | 10/2005 |
| GB | 2427473 B | 7/2008 |
| GB | 2457956 A | 9/2009 |
| JP | 59040287 A | 5/1984 |
| WO | 03/069598 A1 | 8/2003 |
| WO | 03/069769 A2 | 8/2003 |
| WO | 03/071311 A1 | 8/2003 |

* cited by examiner

HIGH 1F
LOW 3F

HIGH 2F
LOW 6F

LOCATOR FOR LOCATING A CURRENT CARRYING CONDUCTOR

FIELD OF THE DISCLOSED SUBJECT MATTER

The disclosed subject matter relates to locators for locating a current carrying conductor.

BACKGROUND

Before commencing excavation or other work where electrical cables, fiber optic cables or other utilities ducts or pipes are buried, it is important to determine the location of such buried cables or pipes to ensure that they are not damaged during the work. It is also useful to be able to track a path of buried cables or pipes. Current carrying conductors emit electromagnetic radiation which can be detected by an electromagnetic antenna. If fiber optic cables or non-metallic utilities ducts or pipes are fitted with a small electrical tracer line, an alternating electrical current can be coupled into the tracer line which in turn radiates electromagnetic radiation. It is known to use detectors to detect the electromagnetic field emitted by conductors carrying alternating current.

One type of such detector works in one of three modes. These modes are classified as either passive or active modes, the passive modes being 'power' mode and 'radio' mode which use signals that are already present—mains power signals and submarine VLF (very low frequency) communications. Each mode has its own frequency band of detection.

Aspects of the disclosed subject matter relate to the active mode.

In the active mode, a signal transmitter couples an alternating magnetic field of known frequency and modulation, in a buried conductor. The signal transmitter may be directly connected to the conductor. Where direct connection access is not possible, a signal transmitter may be placed near to the buried conductor and an alternating current signal may be induced in the conductor by an alternating magnetic field produced by the signal generator. The buried conductor radiates an alternating magnetic field corresponding to the signal produced by the signal transmitter.

The choice of signal frequency is an important factor for effective tracing and identification of buried lines, and there is no single frequency that covers all conditions. For single instruments to be used by relatively non-technical personnel there is no option but to make a compromise, and choose a single frequency high enough to give good performance in the induction mode, but not so high that it will not travel far enough. Active signals between 8 kHz and 33 kHz are commonly used for these applications.

33 kHz is considered to be a good general purpose signal frequency suitable for finding many buried cables and metallic pipes. For short lengths of cable, for example telecom spurs crossing a subscriber's premises, a signal frequency of 33 kHz does not provide sufficient signal to give a good quality locate. This is because the signal return path impedance is high, being predominantly capacitive; the shorter the cable, the lower the capacitance to earth and hence the higher the impedance at a particular frequency. The high impedance results in a small current in the cable.

In this situation a better locate signal quality can be obtained using a higher signal frequency. Multi-frequency locators and transmitters are available having suitable high frequency operating modes, e.g. 66 kHz, 83 kHz and 131 kHz. These products require the operator to select a suitable signal frequency, necessitating a higher degree of operator training and greater expertise than possessed by typical users.

Dedicated single-frequency locators exist that are optimized for finding telecoms cables, but these are less well suited to general cable and pipe locating as high frequency signals dissipate rapidly with distance along a typical cable or pipe.

SUMMARY

According to an embodiment of the disclosed subject matter, there is provided a locator for locating a concealed current carrying conductor. The conductor carries an alternating current having at least a first frequency and a second frequency, wherein the alternating current is produced by at least one dedicated signal generator coupled to the conductor. The locator comprises at least one magnetic field sensor operable to convert electromagnetic radiation from the conductor into a field strength signal; a digital analogue converter configured to generate a digitized signal dependent upon the field strength signal from the magnetic field sensor; a digital signal processor configured to isolate components of the digitized signal resulting from the first frequency and the second frequency; and process the isolated components to generate one or more signals indicative of the proximity of the conductor to the detector; and an output configured to generate an audio and/or visual indication of the proximity of the conductor, wherein the isolated signal components resulting from the first frequency signal and the second frequency signal are contemporaneously processed.

Locators according to the disclosed subject matter allow alternating currents in a concealed conductor having two frequencies to be detected. The two frequencies may for example be 33 kHz and 66 kHz. The frequencies may be detected contemporaneously with each other. Thus an apparatus for locating a concealed conductor may use both frequencies at approximately the same time to locate a conductor. Thus embodiments of the disclosed subject matter provide for the location of cables or pipes in a wide variety of situations without the need for a user to make adjustments to either the signal generator or the locator. Embodiments of the disclosed subject matter thus facilitate a robust and accurate system for locating pipes and cables which does not require specialist knowledge or additional training for a user compared with known products.

In an embodiment of the disclosed subject matter, the second frequency is a harmonic of the first frequency. In an embodiment, the second frequency is twice the first frequency.

In an embodiment of the disclosed subject matter, the locator comprises a heterodyne mixer configured to convert the second frequency to a lower frequency and wherein the digital signal processor is configured to isolate and process the lower frequency signal. This allows frequencies of higher than the Nyquist frequency of the analogue digital converter to be processed in the locator. This has the benefit of facilitating the use of an audio ADC with a sampling frequency of approximately 96 k samples per second to be used with alternating currents having a frequency of 66 kHz or higher.

In an embodiment of the disclosed subject matter, the alternating current having the first frequency and the second frequency are produced by one dedicated signal generator.

In an embodiment of the disclosed subject matter, the alternating current having the first frequency and the second frequency are produced by separate dedicated signal generators.

According to an embodiment of the disclosed subject matter, there is provided a system for locating a concealed conductor. The system comprises a locator according to an aspect of the present invention and a signal generator configured to generate the alternating current having the first frequency and the second frequency.

In an embodiment of the disclosed subject matter, the signal generator comprises a first oscillator configured to generate a first waveform having the first frequency, a first terminal coupled to the first oscillator through a first filter configured to pass signals of the first frequency; a second oscillator configured to generate a second waveform having the second frequency, and a second terminal coupled to the second oscillator through a second filter configured to pass signals of the second frequency.

In an embodiment of the disclosed subject matter, the signal generator can be directly connected to the concealed conductor and for connecting the other of the first and second terminals to the ground.

In an embodiment of the disclosed subject matter, the signal generator can be inductively coupled to the concealed conductor.

In an embodiment of the disclosed subject matter, the signal generator further comprise an induction coil for inductively coupling with the buried conductor and a switching circuit configured to vary the current in the induction coil according to a switching waveform having a first component in the first frequency and a second component in the second frequency. Such an embodiment allows more than one frequency to be efficiently inductively induced in the concealed conductor because the coil is not part of a resonant circuit.

In an embodiment of the disclosed subject matter, the switching circuit comprises four switching devices in an H-bridge formation.

In a further embodiment of the disclosed subject matter, there is provided a method of locating a concealed conductor.

A further embodiment of the disclosed subject matter provides a tangible machine readable medium including instructions for execution by a processor in a locator for locating a concealed conductor. The instructions cause the locator to operate in accordance with the embodiments of the present invention recited above.

There has thus been outlined, rather broadly, certain embodiments of the disclosed subject matter in order that the detailed description thereof herein may be better understood, and in order that the present contribution to the art may be better appreciated. There are, of course, additional embodiments of the disclosed subject matter that will be described below and which will form the subject matter of the claims appended hereto.

In this respect, before explaining at least one embodiment of the disclosed subject matter in detail, it is to be understood that the disclosed subject matter is not limited in its application to the details of construction and to the arrangements of the components set forth in the following description or illustrated in the drawings. The disclosed subject matter is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

BRIEF DESCRIPTION OF THE DRAWINGS

Embodiments of the disclosed subject matter are illustrated by way of example with reference to the drawings in which.

DETAILED DESCRIPTION

Figure 1:
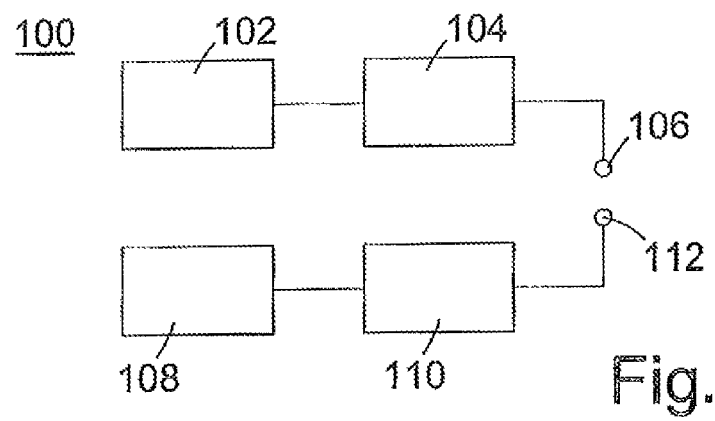
FIG. 1 illustrates a schematic view of a signal generator according to an embodiment of the disclosed subject matter.

FIG. 1 illustrates a signal generator 100 which generates an AC signal for coupling to a buried conductor. The signal generated by the signal generator 100 has two frequencies. A first frequency of 33 kHz and a second frequency of 66 kHz. The signal generator has a first oscillator 102 which generates an AC signal having a frequency of 33 kHz. The first oscillator is connected to a first filter 104 which is configured to allow signals having a frequency of 33 kHz to pass and to attenuate any harmonics produced by the first oscillator. A first terminal 106 is connected to the first filter 104. The signal generator 100 has a second oscillator 108 which generates a signal having a second frequency. In this example, the second frequency is 66 kHz. The second oscillator is connected to a second filter 110. The second filter 110 allows signals having a frequency of around 66 kHz to pass and attenuates harmonics. The second filter 110 is connected to a second terminal 112 of the signal generator 100.

The first and second filters may be for example, low pass filters or band-pass filters.

In use, the signal generator 100 is coupled to a buried conductor by the first terminal 106 and the second terminal 112. The output of the signal generator 100 may be directly connected to the buried conductor. In this case, one of the terminals is connected directly to the pipe or cable at an access point such as a valve, meter or end of the conductor and the circuit is completed by a connection of the other terminal to a ground stake or other ground connection point.

The signal generator 100 may also be inductively coupled to a conductor. This is achieved by the use of an induction clamp. The output from the signal generator is connected to a winding around a magnetic core and the magnetic core is placed around the conductor.

The signal generator 100 thus provides a method of generating a signal having two frequencies in a buried conductor.

Figure 2:
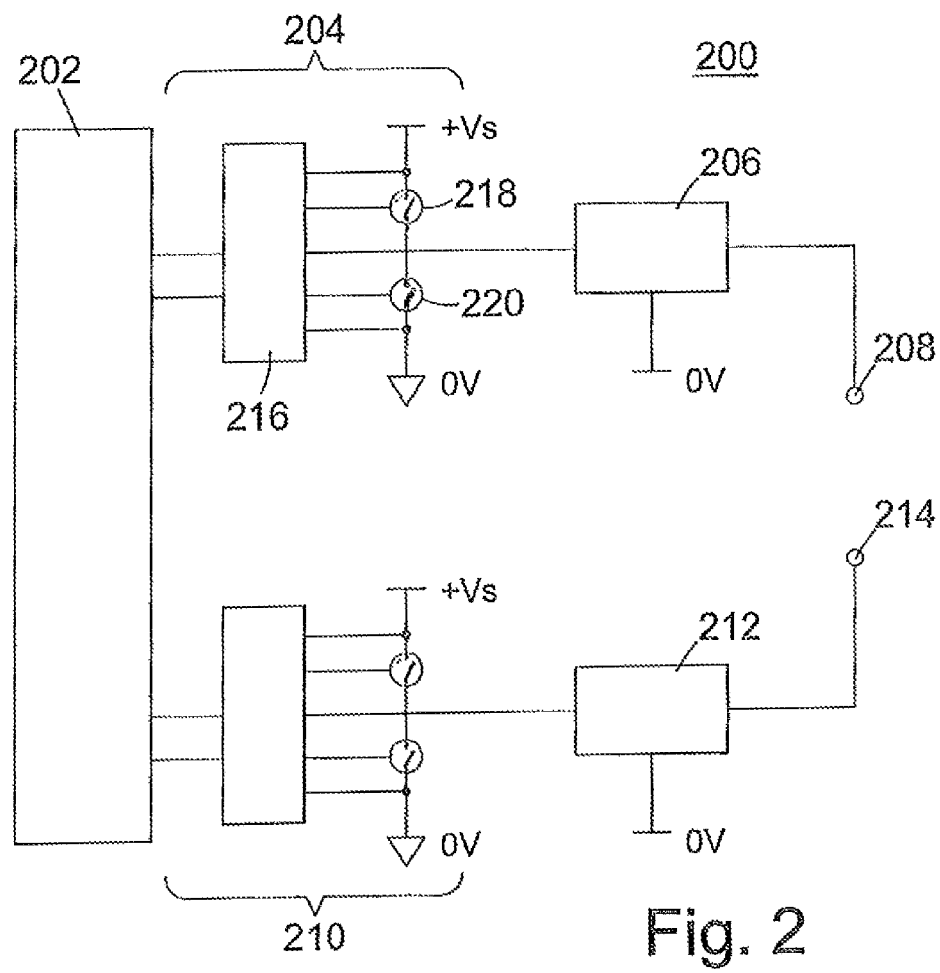
FIG. 2 illustrates a schematic view of a signal generator according to an embodiment of the disclosed subject matter.

FIG. 2 illustrates a schematic diagram of a signal generator 200 for generating a signal having two frequencies. In this embodiment, a controller 202 provides a first waveform having a first frequency and a second waveform having a second frequency. The controller 202 is a complex programmable logic device (CPLD). The first waveform is fed through an amplifier 204 and through a filter 206 to a first terminal 208. The controller 202 also produces a second waveform having a second frequency this is fed through a second amplifier 210 and a second filter 212 to a second terminal 214. The amplifiers 204 and 210 are each formed from a driver 216 which drives two switching devices 218 and 220. The switching devices 218 and 220 are arranged in a half bridge formation.

In use, the controller 202 generates waveforms at a first frequency of 33 kHz and a second frequency of 66 kHz. The waveforms are each selected to suppress signal components at a third harmonic frequency of their fundamental frequency. This waveform is then used by the driver 216 to cause the switching devices 218 and 220 to switch the input of the filter between ground reference and a supply voltage. The filter attenuates harmonics that are present in the waveforms. For example, therefore the filter 206 blocks frequencies other than 33 kHz. Because the driving waveform for the first amplifier 204 is selected to suppress the third harmonic frequency, the largest element that the filter 206 has to block is the fifth harmonic frequency of 33 kHz.

When a load is connected between the terminals 208 and 214 the current returns to ground reference through the opposite filter. The impedances of the components of the filters are selected so that the impedance to ground reference of the second filter 212 for a frequency of 33 kHz (the frequency emitted from the first terminal 208) is low and impedance to the ground reference of the first filter 206 for a frequency of 66 kHz is low.

In the embodiment described above, the half-bridges are controlled by a CPLD. Digital logic (e.g. CMOS), a microcontroller, FPGA, or other digital processors could be used in place of the CPLD. In an alternative embodiment, the oscillators controlling the half-bridges could be provided from a pair of crystal oscillator circuits running independently of one another.

Figure 3A:
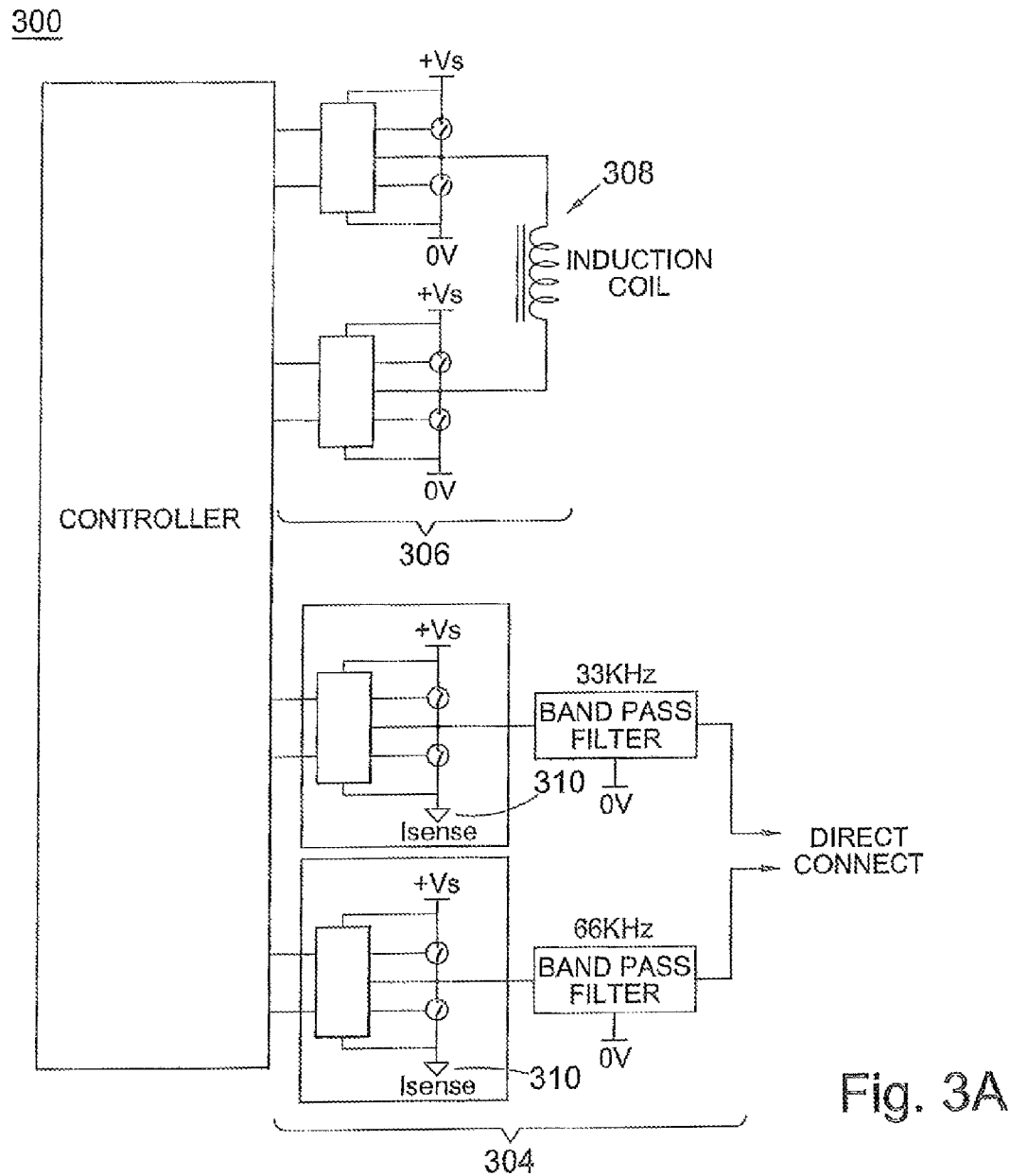
FIG. 3A illustrates a schematic view of a signal generator according to an embodiment of the disclosed subject matter.

FIG. 3A illustrates an embodiment of a signal generator 300 for coupling to a conductor and generating and an alternating current having two frequencies in the conductor. The signal generator 300 has a controller 302 which controls two signal generating elements. There is a signal generating element for direct connecting 304 which is analogous to the circuit described in relation to FIG. 2. The signal generator 300 also has an inductive signal generator 306. The inductive signal generator includes an induction coil 308 which is driven by four switching elements in an H bridge formation. To generate a signal having a first frequency and a second frequency, the controller generates a drive waveform having the first and second frequencies. This drive waveform is used to drive the switching elements in the inductive signal generator 306 and cause the current through the induction coil 308 to vary according to the time integral of the drive waveform.

A current sense point 310 on each of the half bridges is connected to a power supply of the signal generator to regulate the supply voltage if the current between the terminals becomes higher than a threshold.

Figure 3B:
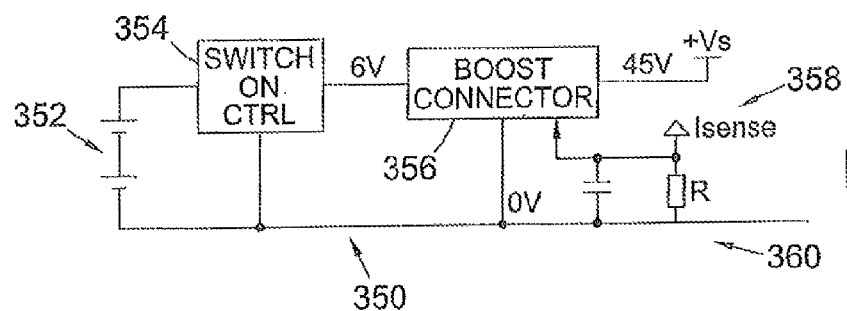
FIG. 3B illustrates a power supply circuit for a signal generator according to an embodiment of the disclosed subject matter.

The power supply 350 is shown in FIG. 3B. The power supply comprises a battery 352. The battery 352 is connected to a switch on control 354. The battery provides a voltage of 6V to a boost converter 356. The boost converter 356 provides the source voltage for the half bridges and H-bridge shown in FIG. 3A. The current sense point 352 is connected to an input of the boost converter 356 and a low pass filter 360. When the current sensed at the current sense points 310 exceeds a threshold the boost converter lowers the supply voltage this regulates the magnitude of the current through the load.

Figure 4A:
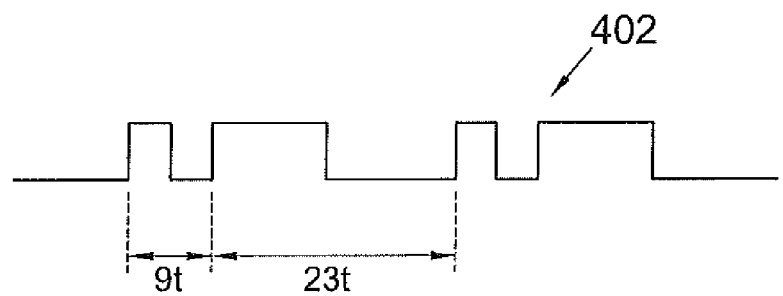
FIG. 4A illustrates a drive waveform for use with an embodiment of the disclosed subject matter.

FIG. 4A illustrates an example of the waveform 402 used to drive the induction coil 308. The waveform 402 is a rectangular waveform with containing pulses having a 9:23 ratio in duration. Such a waveform has been found to produce first and second frequency components where one frequency is twice the other frequency.

Figure 4B:
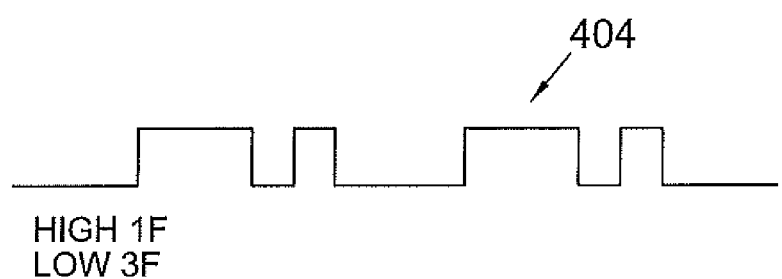
FIG. 4B illustrates a drive waveform for use with an embodiment of the disclosed subject matter.

FIG. 4B illustrates an example of the waveform 404 used to drive the 33 kHz part of the direct connect circuit 304. The waveform 404 has a high component in F=33 kHz and a low component in the third harmonic frequency 3 F.

Figure 4C:
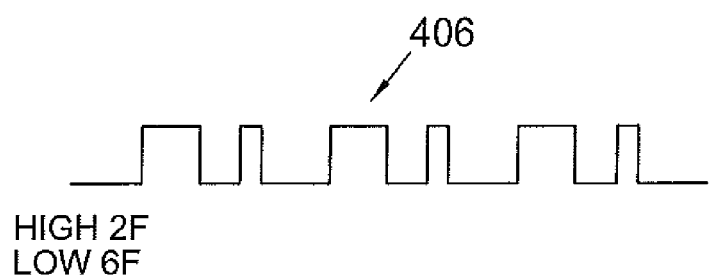
FIG. 4C illustrates a drive waveform for use with an embodiment of the disclosed subject matter.

FIG. 4C illustrates an example of the waveform 406 used to drive the 66 kHz part of the direct connect circuit 304. The waveform 406 has a high component in 2 F=66 kHz and a low component in the third harmonic frequency 6 F.

It is noted that the inductive signal generator 306 is non-resonant. This means that it can generate signals of two different frequencies efficiently. Signal generators for inductively generating a signal in a conductor often comprise a resonant circuit. Such a resonant circuit is effective for generating an alternating current at a frequency close to the resonant frequency of the resonant circuit. However, a resonant circuit is not efficient at generating frequencies outside the resonant frequency bandwidth of the resonant circuit. This means that to generate alternating currents having two frequencies for example 33 kHz and 66 kHz, either a resonant circuit with a broad resonant frequency bandwidth (i.e. a low Q-factor) would have to be used, or the resonant circuit would have to be driven at frequencies a long way from its resonance. Either case would result in an inefficient energy transfer.

For the Signal Generator, the direct-connection output system described above provides the best power efficiency simultaneously with the best signal quality (lowest harmonic content) over the entire load impedance range from zero ohms towards infinity. Best power efficiency is obtained using class D switching amplifiers. Class B amplifiers have theoretical maximum power efficiency of 78% (=pi over 4) at best when amplifying a sinusoidal waveform. Class D improves on this with a theoretical power efficiency limit of 100%. The imperfections of class D are mainly due to switching losses, which become greater as the switching frequency increases, due to repeatedly charging and discharging capacitances in the switching components, resulting in real-world power efficiency of less than 100%. Filtering the output of the switching stage to prevent unwanted switching noise being coupled to the load further reduces power efficiency due to resistive losses in non-ideal inductors and capacitors. To use uniformly sampled class D PWM requires a switching frequency of at least 10 times and preferably at least 20 times the highest signal frequency. In the present application, a highest signal frequency of 66 kHz would necessitate a switching frequency of at least 660 kHz and preferably at least 1.32 MHz. This will result is relatively high switching losses in a Class D amplifier. Such an amplifier would be little better than a class B amplifier.

A more power efficient implementation is embodied by the signal generator described above. By switching a half-bridge at the signal frequency the switching loss in the half-bridge is minimized. Use of a switching waveform that eliminates the third harmonic of the fundamental switching frequency of the half-bridge simplifies the output filter design, since the lowest harmonic frequency requiring attenuation is that of the $5^{th}$ harmonic. Combining two such half-bridge circuits, the first operating at a first frequency (33 kHz) and the second operating at a second frequency (66 kHz) results in a system having minimal power loss, hence maximizing battery life in a portable battery operated signal generator. The signal purity (freedom from unwanted harmonics and noise) is also exemplary.

A locator, or detector for locating conductors carrying an alternating current of two or more frequencies will now be described.

Figure 5:
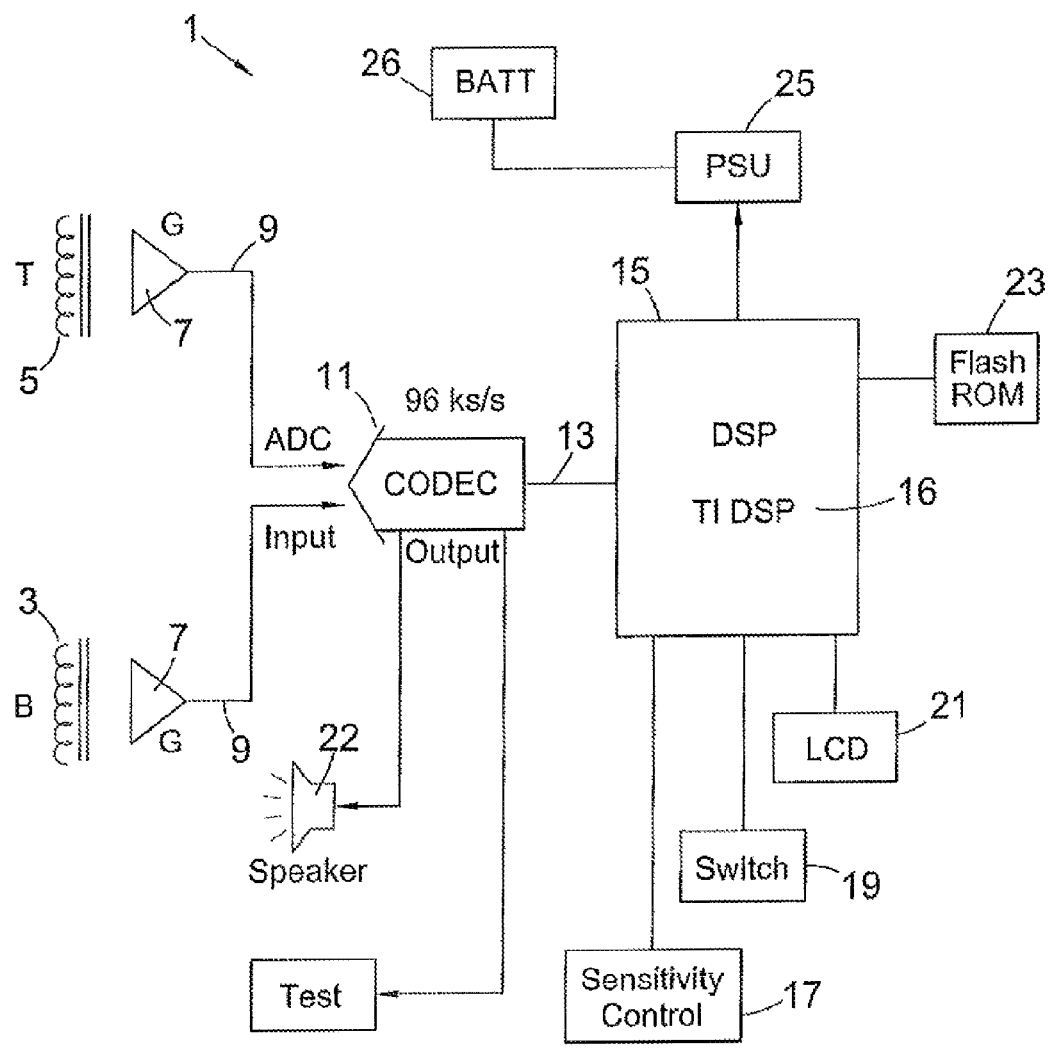
FIG. 5 illustrates a locator according to an embodiment of the disclosed subject matter.

Referring to FIG. 5, a detector 1 has two vertically spaced antennae, namely a bottom antenna 3 and a top antenna 5 within an elongate vertically held housing (not shown) configured to be moveable manually by an operator using a handle. The antennae 3, 5 are arranged with their axes parallel and spaced apart so that in use the bottom antenna 3 will be directly below the top antenna 5, their axes being horizontal. Each antenna 3, 5 produces an electrical signal which is fed into a respective one of two amplifiers 7. The amplifier outputs are field strength signals 9 which are fed into a CODEC 11.

Each of the antennae 3, 5 has a noise floor. Each electrical signal from the antennae 3, 5 is fed to its respective amplifier 7 to lift the noise floor of the magnetic sensor above an intrinsic quantization noise floor of the CODEC 11. The output of each amplifier 7 is fed into the CODEC 11.

The antennae 3, 5 used are high sensitivity wound ferrite rods. Other magnetic sensors may be used such as Hall effect sensors, flux gate magnetometers, or giant magneto resistance sensors.

The CODEC 11 is a 24-bit stereo delta-sigma analogue to digital converter (ADC). This is a relatively cheap device which is commonly used in the audio industry. In Radiodetection Limited's product marketed under the 'RD4000™' trade mark, pre-selective filtering, multiple switch gain stages and a phase sensitive heterodyne circuit are used between the antennae and the ADC. In other prior art cable detectors, more sophisticated and consequently more expensive ADCs are used, as the absolute accuracy of the device measurements is important.

The CODEC 11 used in this embodiment has an absolute accuracy of ±5%, however the way that the CODEC 11 is used makes it an ideal ADC for this application. High dynamic range negates the requirement for multiple gain stages. The high dynamic range is achieved by massively oversampling the bandwidth of detection—the noise shaping aspect of the audio CODEC 11 being an ideal application for this principal.

Notwithstanding the poor absolute accuracy of this audio-grade stereo ADC, the present embodiment benefits from the fact that the detector 1 calculates the depth of a buried conductor by processing and comparing the signals received from the two antennae 3, 5. Therefore, any absolute inaccuracy in the sampling of the CODEC 11 is overcome by comparing the two processed signals. Using this CODEC 11 as a ratiometric device provides a significant cost reduction, without compromising overall performance of the detector 1.

The CODEC 11 oversamples the field strength signals 9 at up to 96 KHz. The output 13 of the CODEC 11 is fed into a digital signal processing block 15, which is comprised of a digital signal processor 16 (DSP).

The DSP 16 primarily has three tasks. Firstly, it is responsible for defining the selectivity of the detection frequency bands. Secondly, it manages the audio and visual outputs of the detector. Thirdly, it provides general control functions to other components of the detector 1.

More details of the operation of the DSP's tasks are provided in Radiodetection Limited's applications published as WO 03/071311, WO 03/069598, WO 03/069769, GB 2400994, and GB 2400674, which are each incorporated herein by reference in their entireties.

Significant benefits are derived from ultra-narrow bandwidth processing, noise typically scaling with the square of bandwidth. The detector 1 processes in several frequency bands simultaneously, allowing ballistic response functions, such as the general locate task, to co-exist with narrow bandwidth functions, such as depth computation. The depth computation task computes in a 1 Hz bandwidth at any frequency up to 44 kHz, the out-of-band rejection being around −120 dB.

Phase tracking allow the narrows bandwidth tasks to lock-on to the carrier frequency when the potential frequency error between transmitter and receiver clocks is in excess of the signal bandwidth. In the case of the active mode, the transmitted signal may be 100% amplitude modulated and the depth calculation task has to position itself exactly on the carrier without cross-talk from the side-bands (located at ±6 Hz around the 32,768 Hz carrier).

The phase tracking algorithm is a natural development of processes described in Radiodetection Limited's UK Patent Application No. 0407372.2. Signal to noise ratio (SNR) measurements are made on the carrier and side-bands and checks performed to ensure the tracking algorithm does not wander off on any high order harmonics due to power-line transmissions. SNR is quantified from both magnitude and second derivative phase information; all results are correlated from both antennae 3, 5. In the case of an SNR less than 10 dB, the depth calculation task is disabled, thus ensuring only accurate information is presented to the user.

The concept of spectral recognition is applied to the active signal when it is in pulsed mode operation. This idea is a simple application of the algorithms described in Radiodetection Limited's UK Patent Application No. 0407372.2 and involves a spectral assessment of the carrier and AM side-bands. The assessment is a Discrete Fourier Transform (DFT) convolution and measurement of the SNR. The DFT itself moves with the tracking algorithm and locks on to the carrier frequency.

The combination of these methods ensures that the detector 1 achieves the best possible signal integrity and depth accuracy.

User control of the detector 1 is provided by means of a sensitivity control 17 and a switch 19. The switch 19 is used to set the mode of operation of the detector 1. For example, the detector 1 can be set to operate in radio, power or active mode. The active mode is chosen when a dedicated signal generator is used in proximity to the cable which is to be detected, the signal generator inducing an alternating current in the conductor which re-radiates a magnetic signal. The signal generator operates at a preset frequency and with a preset modulation which is identified by the detector 1. A further position of the switch 19 is 'avoidance' mode, the operation of which is explained below.

The sensitivity control 17 is used to vary the gradient sensitivity of the antennae 3, 5. High sensitivity is initially used to detect the presence of a weak signal produced by a current carrying conductor. Once the presence of a conductor has been established, the sensitivity control 17 is varied to decrease the sensitivity of the detector 1 and the detector 1 is used to more precisely determine the location of the concealed current carrying conductor. This method of profiling the locate window as a function of sensitivity is described in U.S. Pat. No. 6,777,923 to Radiodetection Limited, which is incorporated herein by reference in its entirety.

A liquid crystal display (LCD) 21 is provided in the housing surface to display such information as the mode of operation of the detector, the battery status, the depth of a conductor and/or the strength of the detected signal. Other user display devices can be used, as will be apparent to the skilled person.

The detector 1 also comprises a flash ROM 23, in which software is stored, and a power supply unit (PSU) 25. A key requirement of the detector 1 is that it must be portable. Therefore, batteries 26 are used to power the detector 1, in this case two 'D'-type batteries, each providing a nominal 1.5V.

In use, the detector 1 is powered up and software is loaded from the flash ROM 23 into the digital signal processing block 15. A user adjusts the switch 19 to select the mode of operation. The selection will be either radio mode, power mode, active mode, or avoidance mode. A depth threshold alarm function is active in power mode, active mode and avoidance mode. In avoidance mode the depth threshold alarm function operates on frequencies in the frequency bands of power mode and active mode. The depth threshold alarm function is detailed below.

When the detector 1 is in proximity to a current carrying conductor, a current is induced in the bottom and top antennae 3, 5. The current induced in each of the antennae 3, 5 is amplified by a respective amplifier 7. The outputs 9 from the amplifiers 7 are field strength signals of the two antennae 3, 5. These signals are input to the CODEC 11 which samples these signals at up to 96 kilo samples per second. The digitized signals 13 are fed to the digital signal processing block 15. The DSP 16 of the digital signal processing block 15 isolates signals of target frequency bands, depending on the mode of operation. If the DSP detects the presence of a current carrying conductor an audio and/or visual alarm is triggered on the speaker 22 and/or indicator 21.

Figure 6A:
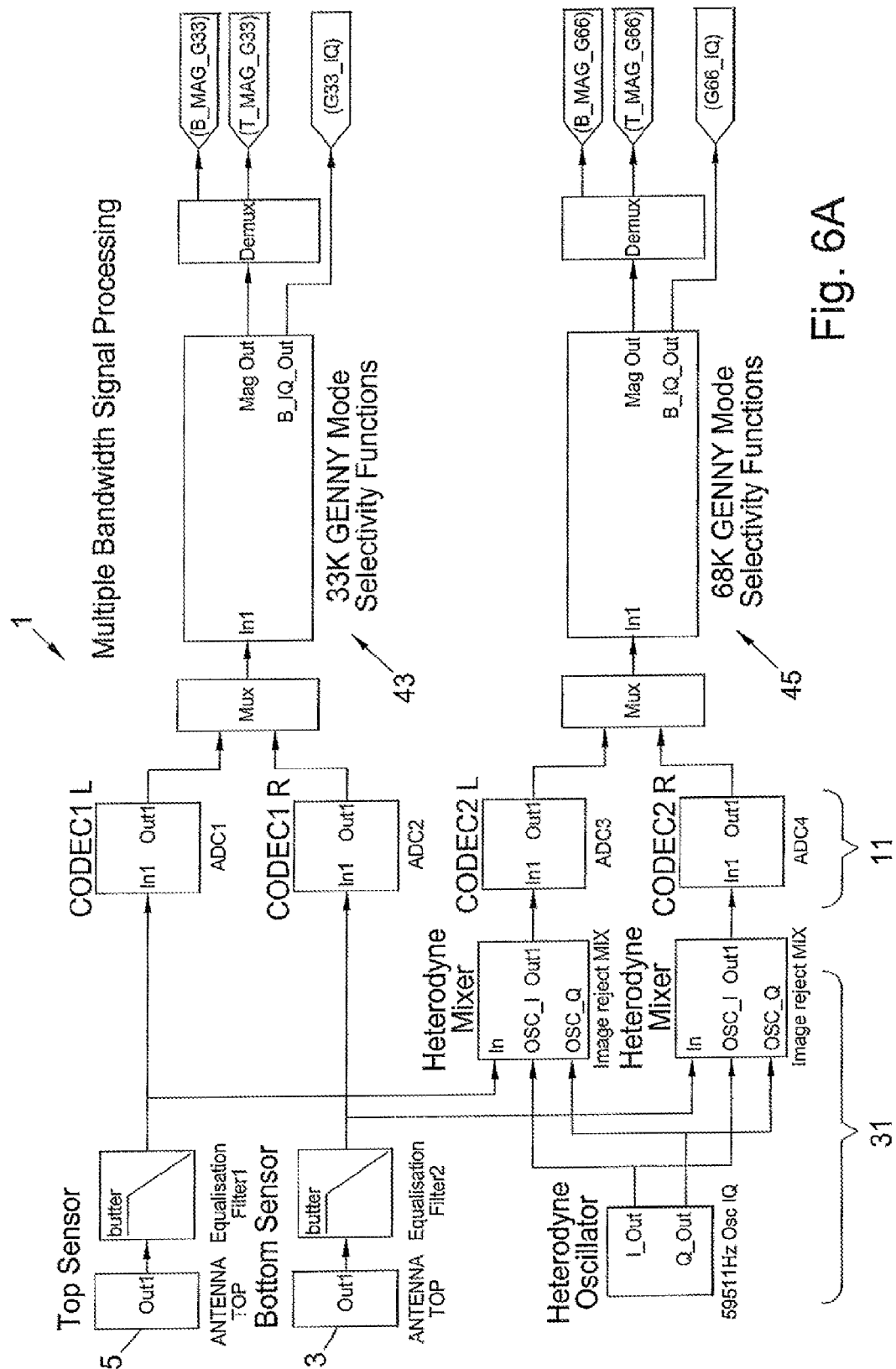
FIG. 6A illustrates a schematic view of a locator according to an embodiment of the disclosed subject matter.
Figure 6B:
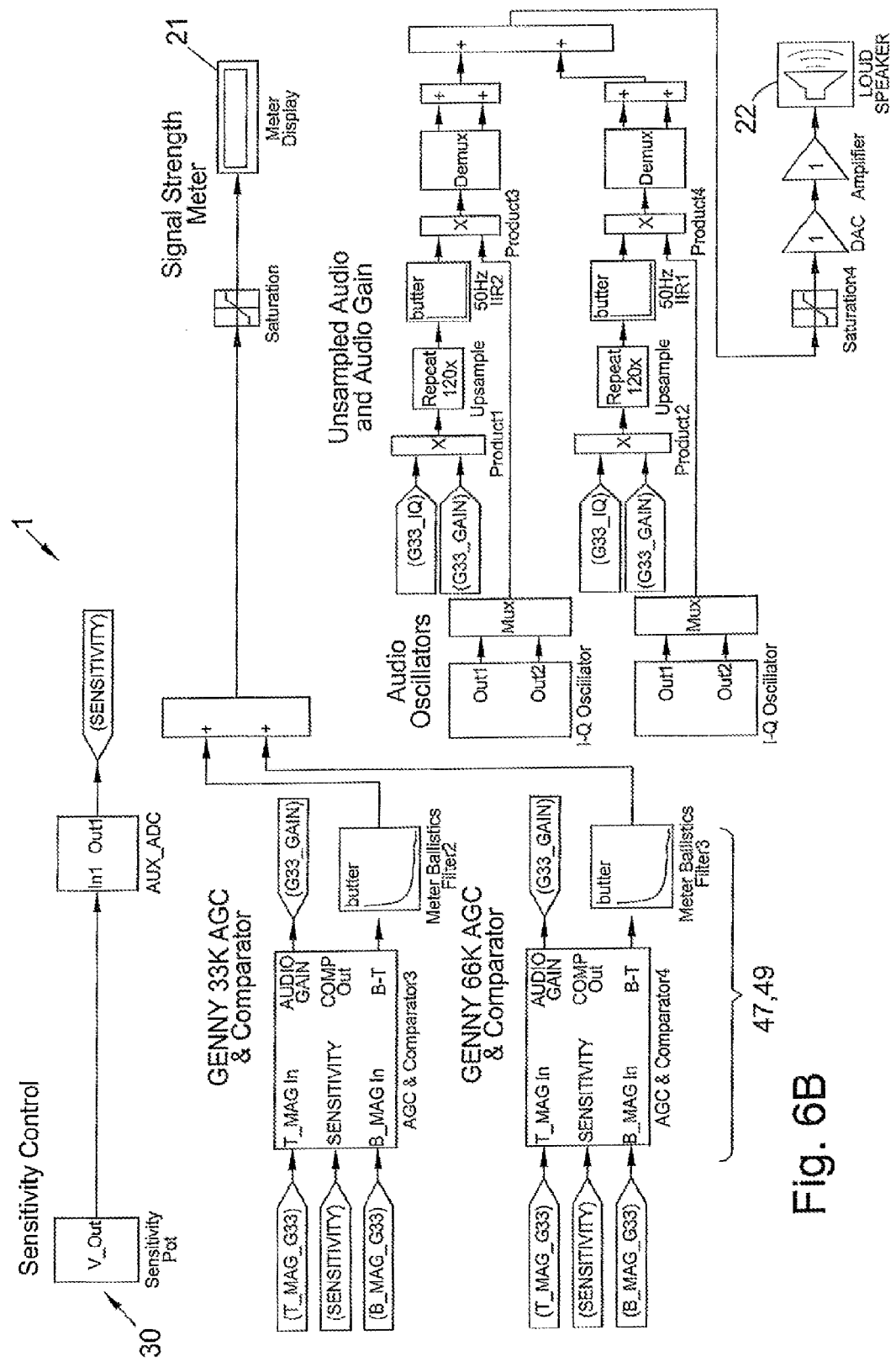
FIG. 6B illustrates a schematic view of a locator according to an embodiment of the disclosed subject matter.

FIGS. 6A and 6B illustrate a more detailed block diagram of the detector 1 showing the dual frequency mode system, which is implemented in the detector 1. As mentioned above, two frequencies 33 kHz and 66 kHz are induced in the conductor being detected.

The detector 1 of this embodiment processes the two frequencies of 33 kHz and 66 kHz simultaneously. The pair of antennae 3, 5 receive signal components of both frequencies. The system also has a common detection indicator 21 and speaker 22 which provide an indication of the depth of the buried conductor calculated from both of the frequency components. The detection sensitivity 30 is normally set to maximum, but can be set at a lower level.

The stereo CODECs 11 are clocked at 73.242 KHz. In order to process the 66 KHz signal, using such a CODEC, a heterodyne system 31 of a heterodyne oscillator and two heterodyne mixers is used to convert the 66 Khz signal into an intermediate frequency 6 KHz signal. As shown in FIG. 6a, an oscillator with a frequency of approximately 60 KHz is used, and the heterodyne mixers reject the signal resulting from the sum of the 60 KHz oscillator and the 66 KHz signal and pass only the difference signal having a frequency of approximately 6 KHz. This is within the Nyquist frequency range of the ADC. The DSP 16 processes the field strength signals produced by the antennae 3, 5 and simultaneously isolates signals of each of the two frequency bands in two mode selectivity functions 43, 45.

In an alternative embodiment, the heterodyne system 31 is omitted and an analogue digital converter having a higher sample rate which places the Nyquist frequency above 66 KHz is used.

Signal outputs from the DSP 16 corresponding to the different frequencies are fed into automatic gain controllers 47 (AGCs), such as the AGC described in U.S. Pat. No. 6,777,923 to Radiodetection Limited, which is incorporated herein by reference in its entirety. The output of each of the AGCs 47 is converted to a detection signal in comparators 49. The detection signals are combined and used to provide an audio output from a speaker 22 and/or a visual signal on an indicator 21, for example on the LCD.

The detector 1 continually calculates the estimated depth of a buried conductor. If the depth of a buried conductor is calculated as less than a preset threshold, e.g. 30 cm, an audio and/or visual alarm may be triggered to alert the operator of a shallow conductor. Such shallow conductors are of particular interest as there is an increased risk of hitting a shallow conductor when excavating an area.

In order to optimize the user interface of the detector, when calculating the depth of a conductor, the DSP 16 processes signals in two frequency bands simultaneously to tailor the manner in which information is presented to the user. The depth of the conductor is calculated in a 1 Hz bandwidth; the visual display is processed in a 10 Hz bandwidth so that the flicker of the display is at an acceptable level; and the processing of the audio alert is performed at 35 Hz, to ensure that the pulsing tone is clearly audible.

Embodiments of the disclosed subject matter may be implemented in combination with a depth threshold alarm, and/or with an 'avoidance mode' as described in UK Patent Application No. 2427473 the contents of which are incorporated herein by reference in their entirety.

While in the embodiments described above, the two frequencies are induced in a conductor by a single signal generator, embodiments of the disclosed subject matter are envisaged in which the two signals are generated by different signal generators. Indeed embodiments of a locator are envisaged in which the different frequencies are induced in different conductors, for example with a different frequency being induced in different types of utility. In such an embodiment, the locator may provide an indication of which frequency is dominant, thereby giving an indication of the utility which is present.

The digital domain signal processing may be implemented in FPGA, DSP, or microcontroller devices, or split across some combination of the aforementioned devices.

Aspects of the disclosed subject matter can be implemented in any convenient form, for example using dedicated hardware, or a mixture of dedicated hardware and software for the processing of the signals. The processing apparatuses can comprise any suitably programmed apparatuses such as a general purpose computer, personal digital assistant, mobile telephone (such as a WAP or 3G-compliant phone) and so on. Since the processing of the disclosed subject matter can be implemented as software, each and every aspect of the disclosed subject matter thus encompasses computer software implementable on a programmable device. Hence, aspects of the disclosed subject matter can be executed on a programmable machine, such as, but not limited to, a microcontroller or computer processor. Program aspects of the technology may be thought of as "products" or "articles of manufacture" typically in the form of executable code and/or associated data that is carried on or embodied in a type of machine readable medium. "Storage" type media include any or all of the memory of mobile stations, computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another computer or processor. For example, software and/or instructions may be communicated from a server to a client. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the subject matter described in this application. Volatile storage media include dynamic memory, such as main memory of such a computer platform. Tangible transmission media include coaxial cables; copper wire, and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution It is to be understood that any feature described in relation to any one aspect may be used alone, or in combination with other features described, and may also be used in combination with one or more features of any other of the disclosed aspects, or any combination of any other of the disclosed aspects. Furthermore, equivalents and modifications not described above may also be employed without departing from the scope of the disclosed subject matter.

The many features and advantages of the disclosed subject matter are apparent from the detailed specification, and thus, it is intended by the appended claims to cover all such features and advantages of the disclosed subject matter which fall within the true spirit and scope of the disclosed subject matter. Further, since numerous modifications and variations will readily occur to those skilled in the art, it is not desired to limit the disclosed subject matter to the exact construction and operation illustrated and described, and accordingly, all suitable modifications and equivalents may be resorted to, falling within the scope of the disclosed subject matter.

We claim:

1. A locator for locating a concealed current carrying conductor, the conductor carrying an alternating current having at least a first frequency and a second frequency different from the first frequency, wherein the alternating current is produced by at least one dedicated signal generator coupled to the conductor, the locator comprising:
   at least one magnetic field sensor that converts electromagnetic radiation from the conductor into a field strength signal;
   an analog to digital converter that generates a digitized signal dependent upon the field strength signals from the magnetic field sensor, the field strength signals being generated in response to the first frequency and the second frequency;
   a digital signal processor programmed to:
   isolate components of the digitized signal resulting from the first frequency and isolate components of the digitized signal resulting from the second frequency from each at least one magnetic field sensor; and process the isolated components to generate one or more signals indicative of the proximity of the conductor to the detector; and
   an output that generates an audio and/or visual indication of the proximity of the conductor, wherein the isolated signal components resulting from the first frequency signal and the second frequency signal are contemporaneously processed.

2. The locator according to claim 1, wherein the second frequency is a harmonic of the first frequency.

3. The locator according to claim 2, wherein the second frequency is twice the first frequency.

4. The locator according to claim 1, further comprising a heterodyne mixer configured to convert the second frequency to a lower frequency, wherein the digital signal processor is programmed to isolate and process the lower frequency signal.

5. The locator according to claim 1, wherein the alternating current having the first frequency and the second frequency are produced by one dedicated signal generator.

6. The locator according to claim 1, wherein the alternating current having the first frequency and the second frequency are produced by separate dedicated signal generators.

7. A system for locating a concealed conductor comprising a locator according to claim 1; and a signal generator configured to generate the alternating current having the first frequency and the second frequency.

8. The system according to claim 7, wherein the signal generator comprises:
   a first oscillator configured to generate a first waveform having the first frequency;
   a first terminal coupled to the first oscillator through a first filter configured to pass signals of the first frequency;
   a second oscillator configured to generate a second waveform having the second frequency; and
   a second terminal coupled to the second oscillator through a second filter configured to pass signals of the second frequency.

9. The system according to claim 8, further comprising a connector for connecting one of the first and second terminals to the concealed conductor and for connecting the other of the first and second terminals directly to an earthen ground.

10. The system according to claim 8, further comprising an inductive coupler for coupling the first and second terminals.

11. The system according to claim 7, the signal generator further comprising an induction coil for inductively coupling the alternating current with the concealed conductor; and
   a switching circuit configured to vary the current in the induction coil according to a switching waveform having a first component in the first frequency and a second component in the second frequency.

12. The system according to claim 11, wherein the switching circuit comprises four switching devices in an H-bridge formation.

13. A method of locating a concealed conductor, the method comprising:

applying an alternating signal to the conductor, the alternating signal having at least a first frequency and a second frequency different from the first frequency;

using at least one magnetic sensor local to the conductor and above ground to generate a field strength signal proportional to the strength of an electromagnetic field resulting from the alternating signal applied to the conductor;

generating a digitized signal dependent upon the field strength signal from the at least one magnetic field sensor in response to the first frequency and the second frequency;

isolating components of the digitized signal from each at least one magnetic sensor resulting from the first frequency and the second frequency;

processing the isolated components to generate at least one signal indicative of the proximity of the conductor to the detector; and generating an indication representing the proximity of the conductor, wherein the isolated signal components resulting from the first frequency signal and the second frequency signal are contemporaneously processed.

14. The method according to claim 13, wherein the second frequency is a harmonic of the first frequency.

15. The method according to claim 14, wherein the second frequency is twice the first frequency.

16. The method according to claim 13, further comprising converting the second frequency to a lower frequency, wherein the lower frequency signal is isolated and processed.

17. The method according to claim 13, wherein the alternating current having the first frequency and the second frequency are produced by one dedicated signal generator.

18. The method according to claim 13, wherein the alternating current having the first frequency and the second frequency are produced by separate dedicated signal generators.

19. A non-transitory tangible machine readable medium including instructions for execution by a processor included in a locator for locating a concealed conductor, the conductor carrying an alternating current having at least a first frequency and a second frequency different from the first frequency, wherein the alternating current having the first frequency and the second frequency is produced by at least one dedicated signal generator coupled to the conductor, the locator having at least one magnetic field sensor operable to convert electromagnetic radiation from the conductor into a field strength signal, wherein the instructions cause the locator to:

generate a digitized signal dependent upon the field strength signal from the at least one magnetic field sensor, the field strength signal being generated in response to the first frequency and the second frequency;

isolate components of the digitized signal from each at least one magnetic field sensor resulting from the first frequency and the second frequency; and process the isolated components to generate at least one signal indicative of the proximity of the conductor to the detector.

20. The locator according to claim 1, wherein the at least one magnetic field sensor comprises a plurality of magnetic field sensors; and wherein the analog to digital converter comprises a plurality of analog to digital converters; and a first one of the plurality of magnetic field sensors is associated with a first one of the plurality of analog to digital converters for the first frequency;

a second one of the plurality of magnetic field sensors is associated with a second one of the plurality of analog to digital converters for the first frequency;

a third one of the plurality of magnetic field sensors is associated with a third one of the plurality of analog to digital converters for the second frequency; and a fourth one of the plurality of magnetic field sensors is associated with a fourth one of the plurality of analog to digital converters for the second frequency.

* * * * *